(12) United States Patent
Bethouart

(10) Patent No.: US 12,460,095 B2
(45) Date of Patent: Nov. 4, 2025

(54) WASHABLE INK COMPOSITION

(71) Applicant: SOCIÉTÉ BIC, Clichy (FR)

(72) Inventor: Carine Bethouart, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 473 days.

(21) Appl. No.: 18/248,009

(22) PCT Filed: Oct. 4, 2021

(86) PCT No.: PCT/EP2021/077289
§ 371 (c)(1),
(2) Date: Apr. 5, 2023

(87) PCT Pub. No.: WO2022/073927
PCT Pub. Date: Apr. 14, 2022

(65) Prior Publication Data
US 2023/0383132 A1 Nov. 30, 2023

(30) Foreign Application Priority Data
Oct. 6, 2020 (EP) ..................................... 20306160

(51) Int. Cl.
*C09D 11/00* (2014.01)
*C09D 11/16* (2014.01)

(52) U.S. Cl.
CPC ..................................... *C09D 11/16* (2013.01)

(58) Field of Classification Search
CPC ..................................................... C09D 11/16
USPC .................................. 106/31.13, 31.31, 31.6
See application file for complete search history.

(56) References Cited

U.S. PATENT DOCUMENTS

| 3,834,823 A | * | 9/1974 | Seregely | ................. | C09D 11/16 106/31.35 |
| 3,949,132 A | * | 4/1976 | Seregely | ................. | C09D 11/16 434/408 |
| 5,854,320 A | * | 12/1998 | Nakamura | ............. | C09D 11/16 524/48 |
| 2004/0147632 A1 | * | 7/2004 | Nakamura | ............. | C09D 11/16 106/31.86 |

FOREIGN PATENT DOCUMENTS

| WO | 9609351 A1 | 3/1996 |
| WO | 2014134284 A1 | 9/2014 |

OTHER PUBLICATIONS

International Search Report and Written Opinion issued in International Application No. PCT/EP2021/077289, mailed on Jan. 25, 2022 (10 pages).

* cited by examiner

*Primary Examiner* — James E Mcdonough
(74) *Attorney, Agent, or Firm* — Bookoff McAndrews, PLLC

(57) ABSTRACT

The present invention concerns a washable aqueous ink composition comprising: a) at least one alkali metal salt of citrate, b) at least one cyclodextrin or derivative thereof, c) at least one dye. It also concerns a writing instrument comprising it and the use of the association of a) at least one alkali metal salt of citrate and b) at least one cyclodextrin or derivative thereof, to improve the washability and/or vividness of the shades of a washable aqueous ink composition.

20 Claims, No Drawings

WASHABLE INK COMPOSITION

CROSS REFENCE TO RELATED APPLICATIONS

This application is a National Stage Application of International Application No. PCT/EP2021/077289, filed on Oct. 4, 2021, now published as WO2022/073927A and which claims priority to European Application No. 20306160.1, filed on Oct. 6, 2020, the entire contents of which is incorporated herein by reference.

TECHNICAL FIELD

The present disclosure concerns washable/rinsable ink compositions, more specifically aqueous washable ink compositions.

Existing washable ink compositions contain «conventional» dyes which are often acid dyes, soluble in water. These dyes can be Food dyestuffs or if not, these dyes must be in conformity with the Toy's Regulation in place if the products are dedicated to children.

The word "washable" means that stains may be removed from common washable fabrics after 1 to 3 washes at 40° C. following ISO 6330:2012 standard.

The "washable" inks contain generally glycol in order to manage surface tension of the inks and to limit the drying of the nib in case the cap of the marker or felt pen is off.

The dyes used have generally a "substantive" character, the size of the dye molecules is so small and the surface tension of the ink is usually low that the stains are difficult to remove from the substrate, mainly on the skin. There is a penetration of the dye molecules into the porosity of the surface.

Existing washable ink formulations having better washability requirements and more specifically whose stains may be removed from the skin with tepid water and soap, contains specific dyes which are often polymeric dyes. These dyes are not Food dyestuffs but these dyes must be in conformity with the Toy's Regulation in place if the products are dedicated to children.

These inks are usually much more expensive and the shades obtained with the polymeric dyes are generally less vivid than the ones obtained with conventional Acid dyes.

SUMMARY

The aim of the disclosure is to formulate washable inks having better washability requirements, more specifically being washable from the skin even with cold water, and containing "conventional dyes" such as acid dyes in order to have more vivid color.

More specifically the inventors have found that there was a synergy in the combined used of at least one alkali metal salt of citrate and at least one cyclodextrin or derivative thereof.

Indeed this combination improves the skin washability of the ink, more specifically with water, even more specifically without using soap, even more specifically using cold water. Moreover acid dyes could be used with this combination in the washable ink, which provides vivid color to the ink.

DETAILED DESCRIPTION

The present disclosure therefore concerns a washable aqueous ink composition comprising:

a) at least one alkali metal salt of citrate, which can be optionally hydrated,
b) at least one cyclodextrin or derivative thereof,
c) at least one dye.

Hereinafter, a detailed description of the present disclosure will be given. The specific embodiments are meant to better illustrate the present disclosure, however, it should be understood that the present disclosure is not limited to these specific embodiments.

In the sense of the present disclosure, the expression "comprising a" should be understood as being synonymous with "comprising at least one".

In the sense of the present disclosure, the expressions "between . . . and . . . " or "ranging from . . . to . . . " should be understood as including the values of the limits.

As indicated above, in the sense of the present disclosure, "a washable ink" is intended to mean any ink, the stains of which may be removed from common washable fabrics after 1 to 3 washes at 40° C. following ISO 6330:2012 standard.

More specifically, the washable ink composition according to the present disclosure is a writing ink. For the purposes of the present disclosure, the term "writing ink" is intended to mean any ink which is intended to be used in a writing instrument, and more specifically in a felt-pen, a highlighter, a roller pen or a marker. A writing ink should not be confused with a printing ink which is used in printing machines and which does not have the same technical constraints, and thus the same specifications. Indeed, a writing ink must not contain solid particles of which the size is greater than the channels of the writing instrument, in order to avoid blocking them, which would inevitably lead to writing being irreversibly stopped. It must also dry sufficiently rapidly to avoid smudging the writing medium. It must also avoid the problems of migration (bleeding) over time. Thus, the writing ink composition according to the present disclosure will be suitable for the writing instrument for which it is intended, more specifically for handheld writing instrument, such as a felt-pen, a highlighter, a roller pen, or a marker. More specifically, the "washable ink" according to the disclosure is suitable on porous substrate.

For the purposes of the present disclosure, the term "porous substrate" is intended to mean substrate that contains pores. The porous substrates have empty spaces or pores that allow external matter, like ink, to penetrate into the substrate. More specifically, writing surfaces such as white board or enamel board are not considered as writing porous substrate. More specifically, the porous substrates are fibrous. For example, the "porous substrate" can be fabrics (such as flax, cotton) such as clothes, cellulosic fiber paper such as paper (printer paper for example) and cardboard paper.

The ink according to the present disclosure is an "aqueous ink". The term "aqueous ink" is intended to mean in the context of the present disclosure a water-based ink, i.e. any ink which contains an aqueous solvent, more specifically water, as the main solvent. In an advantageous embodiment the total amount of the aqueous solvent, more specifically water, is ranging from 30 to 98 wt. %, even more specifically from 40 to 95 wt. %, even more specifically from 50 to 95 wt. %, even more specifically from 60 to 91 wt. %, based on the total weight of the washable aqueous ink composition.

The ink according to the present disclosure comprises at least one alkali metal salt of citrate, which can be optionally hydrated, more specifically sodium citrate or potassium citrate and mixtures thereof, even more specifically sodium citrate, even more specifically trisodium citrate dihydrate.

More specifically the total amount of the at least one alkali metal salt of citrate is ranging from 0.5 to 30 wt. %, more specifically from 1 to 20 wt. %, even more specifically from 2.5 to 17 wt. %, based on the total weight of the washable aqueous ink composition.

The ink according to the present disclosure also comprises at least one cyclodextrin or derivative thereof.

In the sense of the present disclosure, the term "cyclodextrin" (sometimes called cycloamylose) is intended to mean a family of cyclic oligosaccharides, consisting of a macrocyclic ring of glucose subunits joined by α-1,4 glycosidic bonds. Cyclodextrins are typically produced from starch by means of enzymatic conversion. Typical cyclodextrins contain a number of glucose monomers ranging from six to eight units in a ring, creating a cone or hollow stopper shape. More specifically the cyclodextrins according to the disclosure are selected among α (alpha)-cyclodextrin (α-CD), β (beta)-cyclodextrin (β-CD) and γ (gamma)-cyclodextrin (γ-CD).

The properties of these cyclodextrins are indicated in the following table 1:

| Characteristics | α-CD | β-CD | γ-CD |
| --- | --- | --- | --- |
| Glucose monomers number | 6 | 7 | 8 |
| Diameter of the cavity | 4.7-5.3 | 6.0-6.5 | 7.5-8.3 |
| Diameter of the periphery (+/−0.4) | 14.6 | 15.4 | 17.5 |
| Water molecule number in the cavity | 6-8 | 11-12 | 13-17 |
| Solubility in water (g for 100 mL) | 14.5 | 1.85 | 23.2 |

More specifically the α-cyclodextrin comprises a 6-membered sugar ring molecule, the β-cyclodextrin comprises a 7-membered sugar ring molecule and γ-cyclodextrin comprises an 8-membered sugar ring molecule.

In the sense of the present disclosure, the term "cyclodextrin derivative" is intended to mean any cyclodextrin which has been modified by the use of one or several substituents. More specifically the substituent replaces either the entire hydroxyl group or the hydrogen atom on one or more of the hydroxyl groups of the cyclodextrin ring. Therefore more specifically the cyclodextrin derivative is selected among alkylated derivatives which can be optionally hydroxylated, etherified derivatives, amino derivatives, esterified derivatives, hydroxylated derivatives and mixture thereof. Particularly the cyclodextrin derivative is selected among hydroxyl-$C_1$-$C_6$-alkyl-cyclodextrin (such as hydroxypropyl-cyclodextrin and hydroxyethyl-cyclodextrin), sulfo-$C_1$-$C_6$-alkyl-ether-cyclodextrin (such as sulfobutylether-cyclodextrin), $C_1$-$C_6$-alkyl-cyclodextrin (such as methyl-cyclodextrin), carboxy-$C_1$-$C_6$-alkyl-cyclodextrin (such as carboxymethyl-cyclodextrin), glucosyl-cyclodextrin, maltosyl-cyclodextrin and mixture thereof, even more specifically the cyclodextrin derivative is selected among hydroxypropyl-α-cyclodextrin, sulfobutylether-α-cyclodextrin, hydroxypropyl-β-cyclodextrin (or HP-β-CD or 2-hydroxypropyl-β-cyclodextrin), methyl-β-cyclodextrin (or M-β-CD or 2,6-dimethyl-β-cyclodextrin), sulfobutylether-β-cyclodextrin (or SBE-β-CD), carboxymethyl-β-cyclodextrin (or CM-β-CD), glucosyl-β-cyclodextrin, maltosyl-β-cyclodextrin, hydroxyethyl-p-cyclodextrin, hydroxypropyl-γ-cyclodextrin, sulfobutylether-γ-cyclodextrin and mixture thereof. Specifically the at least one cyclodextrin or derivative thereof is selected in the group consisting of hydroxy-propyl-β-cyclodextrin, α-cyclodextrin, β-cyclodextrin, methyl-β-cyclodextrin, γ-cyclodextrin and mixture thereof, even more specifically the at least one cyclodextrin or derivative thereof is selected in the group consisting of hydroxy-propyl-β-cyclodextrin, β-cyclodextrin, and mixture thereof, even more specifically it is hydroxy-propyl-β-cyclodextrin.

More specifically the hydroxy-propyl-β-cyclodextrin is available commercially for example under the name Kleptose® HP from Roquette.

More specifically, the at least one cyclodextrin or derivative thereof is selected in the group consisting of cyclodextrin, such as α-cyclodextrin, β-cyclodextrin, γ-cyclodextrin, and alkylated derivatives, which can be optionally hydroxylated, etherified derivatives, amino derivatives, esterified derivatives, hydroxylated derivatives and mixture thereof.

More specifically the total amount of the at least one cyclodextrin or derivative thereof is ranging from 0.1 wt. % to 35 wt. %, more specifically from 1 wt. % to 35 wt. %, even more specifically from 1.5 to 15 wt. %, even more specifically from 2 to 10 wt. %, based on the total weight of the washable aqueous ink composition.

More specifically, the washable aqueous ink composition of the disclosure comprises a weight ratio of at least one alkali metal salt of citrate/at least one cyclodextrin or derivative thereof ranging from 0.1:1 to 150:1, more specifically a weight ratio from 0.1:1 to 50:1, even more specifically 0.5:1 to 10:1.

The ink composition of the disclosure also comprises at least one dye, more specifically a mixture of dyes, solubilized in water. The term "dyes" should be understood as meaning colored, mineral or organic particles of any form, which are soluble in the medium in which they are solubilized (here water), and which are intended to color the ink composition. The at least one dye may be selected in the group consisting of direct dyes (for example C.I direct black 17, 19, 22, 32, 38, 51, 71; C.I direct yellow 4, 26, 44, 50; C.I direct red 1, 4, 23, 31, 37, 39, 80, 81, 83, 225, 226, 227; C.I direct blue 1, 15, 41, 71, 86, 87, 106, 108, 199, and the like), acid dyes (for example C.I acid black 1, 2, 24, 26, 31, 52, 107, 109, 110, 119, 154; C.I acid yellow 1, 7, 17, 19, 23, 25, 29, 38, 42, 49, 61, 72, 78, 110, 127, 135, 141, 142; C.I acid red 8, 9, 14, 18, 26, 27, 33, 35, 37, 51, 52, 57, 82, 83, 87, 92, 94, 111, 129, 131, 138, 186, 249, 254, 265, 276; C.I acid violet 15, 17, 49; C.I acid blue 1, 3, 7, 9, 15, 22, 23, 25, 40, 41, 43, 62, 78, 83, 93, 100, 103, 104, 112, 113, 158; C.I acid green 3, 9, 16, 25, 27; C.I acid orange 56, and the like), food dyes (such as C.I. food yellow 3, and the like), Malachite green (C.I 4200) Victoria blue FB (C.I. 44045) methyl violet FN (C.I. 42535), rhodamine F4G (C.I. 45160), and rhodamine 6GCP (C.I 45160), and mixtures thereof. More specifically, the at least one dye comprises an acid dye, even more specifically it consists in an acid dye.

More specifically the total amount of the at least one dye is ranging from 0.01 to 20 wt. %, even more specifically from 0.01 to 15 wt. %, even more specifically from 0.1 to 10 wt. %, even more specifically from 1 to 6 wt. %, based on the total weight of the washable aqueous ink composition.

The ink composition of the disclosure can further contains at least one humectant, the at least one humectant being more specifically a water-soluble alcohol having a melting point of less than 20° C. and a boiling point of at least 150° C., even more specifically the at least one humectant has a solubility in water of at least 10 g/L at 20° C., even more specifically at least 20 g/L at 20° C. The humectant lets to improve the «cap-off», i.e. the ability of the ink composition of not drying up in the writing instrument, which means more specifically that the writing instrument can be left open for longer period of time, even more specifically one hour or even several hours, even more specifically with removed cap-off, without drying up. More precisely, the humectant comprises an aliphatic alcohol wherein the hydrocarbon chain can be interrupted or not by one or more heteroatom, more specifically chosen from oxygen, nitrogen and sulfur, even more specifically oxygen and even more specifically wherein the alcohol has at least 2 hydroxyl groups. The humectant is more specifically selected in the group consisting of glycerin, ethylene glycol, sorbitol, diethylene glycol, triethylene glycol, propylene glycol, and thiodiglycol, and mixtures thereof, even more specifically in the group consisting of glycerin, sorbitol and mixtures thereof, more particularly it is sorbitol, even more specifically D-sorbitol. It is for example available on the market in the name Neosorb® 70/70 from Roquette.

More specifically the total amount of the at least one humectant is ranging from 1 to 50 wt. %, and even more specifically from 2 to 40 wt. %, and even more specifically from 5 to 35 wt. %, based on the total weight of the washable aqueous ink composition.

The ink composition according to disclosure can further contain an additive known by the skilled person to be usable in aqueous ink compositions, more specifically in aqueous writing ink compositions, even more specifically selected in the group consisting of antimicrobial agents, antifungal agents, dispersing agents, wetting agents, pH regulators, rheology modifiers and mixtures thereof.

More specifically the total amount of the additive is ranging from 0.05 to 15 wt. %, even more specifically from 0.075 to 10 wt. %, based on the total weight of the washable aqueous ink composition.

More specifically among the additives, the ink composition of the disclosure may even more specifically contain at least one antimicrobial agent such as methyl paraben, phenoxyethanol, isothiazolinone, 1,2-benzoisothiazolin-3-one, 2-methyl-4-isothiazolin-3-one, and mixtures thereof.

More specifically, the antimicrobial agent is present in the ink composition of the disclosure in a content ranging from 0.05 to 5% by weight, and even more specifically from 0.075 to 2% by weight, based on the total weight of the washable aqueous ink composition.

More specifically among the additives, the ink composition of the present disclosure may also contain a pH regulator, even more specifically chosen in the group consisting of ammonia, urea, monoethanolamine, diethanolamine, triethanolamine, alkali metal salts of phosphoric acid such as tripolyphosphate, sodium carbonate and hydroxides of alkali metals such as sodium hydroxide.

The present disclosure also concerns a method for preparing a washable aqueous ink composition according to the disclosure, comprising the steps of:
(i) under stirring, adding the at least one cyclodextrin or derivative thereof and the at least one dye to water,
(ii) under stirring, adding the optional additive(s), the optional humectant and the at least one alkali metal salt of citrate, which can be optionally hydrated, to the mixture obtained in step (i).

The at least one cyclodextrin or derivative thereof, at least one alkali metal salt of citrate, at least one dye, water, as well as the optional humectant and additive(s), are as defined above for the washable aqueous ink composition according to the disclosure.

During steps (i) and (ii) the ink ingredients are mixed under stirring more specifically at a temperature of between 40 and 50° C., even more specifically at a temperature of 45° C.+/−2° C., even more specifically at a stirring speed ranging from 200 to 700 rpm, and even still more specifically at a stirring speed of 500 rpm.

The ink composition obtained in steps (i) and (ii), can be homogenized during a certain period of time ranging from 15 to 40 minutes, and more specifically from 20 to 35 minutes.

The present disclosure also concerns a writing instrument, more specifically a handheld writing instrument, more specifically a pen such as a felt-pen, a highlighter, a roller pen or a marker, and more even more specifically it is a writing felt-pen, a coloring felt-pen, a highlighter, containing an ink composition according to the disclosure.

According to a preferred embodiment, the writing instrument according to the present disclosure comprises:
an axial barrel containing an ink composition according to the disclosure, and
a pen body which delivers the ink composition stored in the axial barrel.

The present disclosure finally concerns the use of the association of a) at least one alkali metal salt of citrate, which can be optionally hydrated, and b) at least one cyclodextrin or derivative thereof, more specifically as described above, to improve the washability (even more specifically on skin and clothes) and/or vividness of the shades of a washable aqueous ink composition. More specifically the use is for improving the washability of a washable aqueous ink composition, particularly the water washability of a washable aqueous ink composition, more particular the water washability without soap, more particularly when washing with cold water.

In addition to the foregoing, the disclosure also comprises other provisions which will emerge from the additional description which follows, which relates to the preparation of writing ink compositions according to the present disclosure and comparative examples.

Example 1: Preparation of Ink Compositions According to the Present Invention and Comparative Ink Compositions Compositions according to the invention (Ex 1 and Ex 2) and comparative compositions (without sodium citrate: comparative Ex 1 or without any cyclodextrin or derivative thereof: comparative Ex 2) were prepared. Their ingredients and weight % are indicated in table 2.

TABLE 2

| | ingredients, function and % by weight of the ink composition | | | | |
|---|---|---|---|---|---|
| Chemical name | Ex 1 in wt. % | Ex 2 in wt. % | Comparative Ex 1 in wt. % | Comparative Ex 2 in wt. % | Function |
| Water | 85.6 | 65.60 | 90.6 | 90.5 | Solvent |
| Trisodium citrate dihydrate (sodium citrate) | 5.00 | 15.00 | — | 5.0 | washable additive |

TABLE 2-continued ingredients, function and % by weight of the ink composition

| Chemical name | Ex 1 in wt. % | Ex 2 in wt. % | Comparative Ex 1 in wt. % | Comparative Ex 2 in wt. % | Function |
|---|---|---|---|---|---|
| Kleptose HP (hydroxypropyl betacyclodextrin) | 4.9 | 4.9 | 4.9 | — | washable additive |
| Neosorb 70/70 (sorbitol syrup) | — | 10.00 | — | — | Cap-off additive |
| Acid blue 9 | 1.60 | 1.60 | 1.60 | 1.60 | Dye |
| Acid red 18 | 1.20 | 1.20 | 1.20 | 1.20 | Dye |
| Acid red 52 | 0.80 | 0.80 | 0.80 | 0.80 | Dye |
| Acid yellow 23 | 0.80 | 0.80 | 0.80 | 0.80 | Dye |
| Methylparaben | 0.10 | 0.10 | 0.10 | 0.10 | Biocide |
| Total | 100.0% | 100.0% | 100.0% | 100.0% | |

The process of preparation of these ink compositions are as follow:

Comparative Ex 1: For a preparation of 1 kg, 906 g of deionized water were introduced and heated at 45° C.+/−2° C. (maintain the temperature until the end of the manufacturing) in a dissolver DISPERMAT® LC75 (dissolver disc Ø60 mm), and 49 g of Kleptose HP were added under agitation (stirring speed: 500 rpm). After 5 min, the dyes were added successively at the same stirring speed; 16 g of Acid Blue 9, 12 g of Acid Red 18, 8 g of Acid red 52 and 8 g of Acid Yellow 23. After 15 minutes, 1 g of Methylparaben were introduced. The mixture was stirred for 10 minutes more to obtain the final ink composition.

Comparative Ex 2: For a preparation of 1 kg, 905 g of deionized water were introduced and heated at 45° C.+/−2° C. (maintain the temperature until the end of the manufacturing) in a dissolver DISPERMAT® LC75 (dissolver disc Ø60 mm), and 50 g of sodium citrate were added under agitation (stirring speed: 500 rpm). After 10 min, the dyes were added successively at the same stirring speed; 16 g of Acid Blue 9, 12 g of Acid Red 18, 8 g of Acid red 52 and 8 g of Acid Yellow 23. After 15 minutes, 1 g of Methylparaben were introduced. The mixture was stirred for 10 minutes more to obtain the final ink composition.

EX 1: For a preparation of 1 kg, 856 g of deionized water were introduced and heated at 45° C.+/−2° C. (maintain the temperature until the end of the manufacturing) in a dissolver DISPERMAT® LC75 (dissolver disc Ø60 mm), and 49 g of Kleptose HP were added under agitation (stirring speed: 500 rpm). After 5 min, the dyes were added successively at the same stirring speed; 16 g of Acid Blue 9, 12 g of Acid Red 18, 8 g of Acid red 52 and 8 g of Acid Yellow 23. After 15 minutes, 1 g of Methylparaben and 50 g of sodium citrate were introduced. The mixture was stirred for 10 minutes more to obtain the final ink composition.

EX 2: For a preparation of 1 kg, 656 g of deionized water were introduced and heated at 45° C.+/−2° C. (maintain the temperature until the end of the manufacturing) in a dissolver DISPERMAT® LC75 (dissolver disc Ø60 mm), and 49 g of Kleptose HP were added under agitation (stirring speed: 500 rpm). After 5 min, the dyes were added successively at the same stirring speed; 16 g of Acid Blue 9, 12 g of Acid Red 18, 8 g of Acid red 52 and 8 g of Acid Yellow 23. After 15 minutes, 100 g of Neosorb 70/70, 1 g of Methylparaben and 150 g of sodium citrate were introduced. The mixture was stirred for 10 minutes more to obtain the final ink composition.

Example 2: Washability Tests of the Ink Compositions According to the Present Invention and Comparative Ink Compositions The following tests were performed on the ink compositions (Ex 1, Ex 2, comparative Ex 1 and comparative Ex 2).
Washability Performance: Measurement of Skin Washability with Cold Water and without Soap This test is the ability of the consumer to wash correctly the written mark applied on the skin with cold water and without soap.

The method is as follows:
1. Clean hands before performing this test.
2. Make a smear (dimension 2×1 cm) to back of the hand.
3. Allow to dry for 15 min (do not wash the hands during this drying time).
4. After 15 min of drying, place the hand under cold water (10-15°) during 15 seconds, without rubbing hands.
5. Dry the hands with absorbent paper and evaluate the scoring of this test.

The scoring of this test is defined as follows:
10: The washability of the ink composition is very efficient.
7.5: The washability of the ink composition is efficient (with very slight remaining traces).
5: The washability of the ink composition is not very efficient (with visible remaining traces).
2.5: The washability of the ink composition is not efficient (traces hardly removed).
0: The washability of the ink composition is not efficient at all (traces not removed).

The results are indicated in Table 3 below.
Washability Performance: Measurement of Skin Washability with Tepid Water (30-40° C.) and Soap This test is the ability of the consumer to wash correctly the written mark applied on the skin with tepid water (30-40° C.) and soap.

The method is as follows:
1. Clean hands before performing this test.
2. Make a smear (dimension 2×1 cm) to back of the hand.
3. Allow to dry for 1 hour (do not wash the hands during this drying time).
4. After 1 hour of drying, place the hand under tepid water (30-40° C.) during 15 seconds, and add soap (for example Marseille® soap) while rubbing hands during 10 to 15 seconds.
5. Rinse the hands under water (30-40° C.).
6. Dry the hands with absorbent paper and evaluate the scoring of this test.

The scoring of this test is defined as follows:
10: The washability of the ink composition is very efficient.
7.5: The washability of the ink composition is efficient (with very slight remaining traces).
5: The washability of the ink composition is not very efficient (with visible remaining traces).
2.5: The washability of the ink composition is not efficient (traces hardly removed).
0: The washability of the ink composition is not efficient at all (traces not removed).

The results are indicated in Table 3 below.

Washability Performance: Measurement of Cloth Washability Resistance (Line Method)

This test is the ability of the consumer to wash correctly the written mark applied by line method on fabrics.

Equipment:
1. Air conditioned and humidity controlled room: 23° C. (±2°); 50% RH (±5% RH).
2. Washing machine according to ISO 6330:2012 type A standard (such as Programmable Wascator Fom71 CLS Electrolux Lab washing machine)
3. Detergent:
   77 g of European Colorfastness Establishment detergent basis
   20 g of tetrahydrated sodium perborate
   3 g of tetra-acetyl-ethylene diamine
4. Diacetate—Wool multifibers (DW) fabric strip for staining with the following materials: wool, polyacrylic, polyester, polyamide, cotton, acetate (ISO 105 F10 standard)
5. 2 kg of additional load fabric (type II, 50% cotton, 50% polyester (ISO 6330:2012 standard))

The method is as follows:
1. Fix the fabric strip on a non-porous support thanks to pins in order to keep the fabric flat and properly laid.
2. Draw three lines about 10 cm length on fabric strip.
3. Let the fabric strip on air dry in room with conditioned air during 24 hours.
4. Put the fabric strip in the washing machine drum and add the corresponding additional load fabric: 50% cotton, 50% polyester.
5. Put 20 g of detergent in the tank dedicated to powder.
6. Launch the washing program (40° C.).
7. When washing is finished, take out both the fabric strip and loads from the machine and let them air dry during 24 hours minimum.
8. Evaluate the scoring of this test.
9. If written mark is visible after $1^{st}$ washing, repeat steps 6, 7, 8 of this method.

The scoring of this test is defined as follows:
10/10: The washability of the ink composition is very efficient.
7.5/10: The washability of the ink composition is efficient (with very slight remaining traces).
5/10: The washability of the ink composition is not very efficient (with visible remaining traces).
2.5/10: The washability of the ink composition is not efficient (traces hardly removed).
0/10: The washability of the ink composition is not efficient at all (traces not removed).

The results are indicated in Table 3 below.

Washability Performance: Measurement of Cloth Washability Resistance (Capillarity Method)

This test is the ability of the consumer to wash correctly the written mark by capillary method applied on fabrics.

Equipment:
1. Air conditioned and humidity controlled room: 23° C. (±2°); 50% RH (±5% RH).
2. Washing machine according to ISO 6330:2012 type A standard (such as Programmable Wascator Fom71 CLS Electrolux Lab washing machine)
3. Detergent:
   77 g of European Colorfastness Establishment detergent basis
   20 g of tetrahydrated sodium perborate
   3 g of tetra-acetyl-ethylene diamine
4. Diacetate—Wool multifibers (DW) fabric strip for staining with the following materials: wool, polyacrylic, polyester, polyamide, cotton, acetate (ISO 105 F10 standard)
2 kg of additional load fabric (type II, 50% cotton, 50% polyester (ISO 6330:2012 standard))

The method is as follows:
1. Fix the fabric strip on a non-porous support thanks to pins in order to keep the fabric flat and properly laid.
2. Transfer ink drop from the pen tip during 5 seconds on fabric strip
3. Let the fabric strips on air dry in room with conditioned air during 24 hours.
4. Put the fabric strip in the washing machine drum and add the corresponding additional load fabric: 50% cotton, 50% polyester.
5. Put 20 g of detergent in the tank dedicated to powder.
6. Launch the washing program (40° C.).
7. When washing is finished, take out both the fabric strip and loads from the machine and let them air dry during 24 hours minimum.
8. Evaluate the scoring of this test.
9. If written mark is visible after 1st washing, repeat steps 6, 7, 8 of this method.

The scoring of the test is defined as follows:
10/10: The washability of the ink composition is very efficient.
7.5/10: The washability of the ink composition is efficient (with very slight remaining traces).
5/10: The washability of the ink composition is not very efficient (with visible remaining traces).
2.5/10: The washability of the ink composition is not efficient (traces hardly removed).
0/10: The washability of the ink composition is not efficient at all (traces not removed).

The results are presented in table 3 below

TABLE 3 results of the tests

| Test | | Ex 1 | Ex 2 | Comp Ex 1 | Comp Ex 2 |
|---|---|---|---|---|---|
| Skin washability cold | User 1 | 7.5 | 10 | 5 | 5 |
| water without soap 15 s | User 2 | 7.5 | 10 | 5 | 5 |
| (after waiting time 15 min) | User 3 | 7.5 | 7.5 | 5 | 2.5 |
| Skin washability tepid | User 1 | 10 | 10 | 10 | 10 |

TABLE 3-continued results of the tests

| Test | | Ex 1 | Ex 2 | Comp Ex 1 | Comp Ex 2 |
|---|---|---|---|---|---|
| water with soap 15 s (after waiting time 1 h) | User 2 | 10 | 10 | 10 | 7.5 |
| | User 3 | 10 | 10 | 7.5 | 5 |
| Cloth washability resistance LINE METHOD | Wool | 10/10 1st wash | 10/10 1st wash | 10/10 1st wash | 10/10 1st wash |
| | Polyacrylic | 10/10 1st wash | 10/10 1st wash | 10/10 1st wash | 10/10 1st wash |
| | Polyester | 10/10 1st wash | 10/10 1st wash | 10/10 1st wash | 10/10 1st wash |
| | Polyamide | 10/10 1st wash | 10/10 1st wash | 10/10 1st wash | 10/10 1st wash |
| | Cotton | 10/10 1st wash | 10/10 1st wash | 10/10 1st wash | 10/10 1st wash |
| | Acetate | 10/10 1st wash | 10/10 1st wash | 10/10 1st wash | 10/10 1st wash |
| Cloth washability resistance CAPILLARITY METHOD | Wool | 10/10 1st wash | 10/10 1st wash | 10/10 1st wash | 10/10 1st wash |
| | Polyacrylic | 10/10 1st wash | 10/10 1st wash | 10/10 1st wash | 10/10 1st wash |
| | Polyester | 10/10 1st wash | 10/10 1st wash | 10/10 1st wash | 10/10 1st wash |
| | Polyamide | 10/10 1st wash | 10/10 1st wash | 10/10 1st wash | 10/10 1st wash |
| | Cotton | 10/10 1st wash | 10/10 1st wash | 10/10 1st wash | 10/10 1st wash |
| | Acetate | 10/10 1st wash | 10/10 1st wash | 10/10 1st wash | 10/10 1st wash |

As can be seen, the ink compositions according to the invention (Ex 1, Ex 2) exhibit good results in terms of washability. Indeed, the compositions have good washability on clothes of different materials and on skin, with tepid water and with cold water as well, even without soap. In particular, the washability of the ink compositions according to the invention (Ex 1, Ex 2) exhibits better results in terms of skin washability and in particular with cold water, when compared to the ink composition without sodium citrate (Comparative Ex 1) and when compared to ink composition without hydroxypropyl betacyclodextrin (Comparative Ex 2).

The invention claimed is:
1. A washable aqueous ink composition comprising:
 a) at least one alkali metal salt of citrate, which can be optionally hydrated,
 b) at least one cyclodextrin or derivative thereof,
 c) at least one dye.
2. The washable aqueous ink composition according to claim 1, wherein the at least one alkali metal salt of citrate is sodium citrate.
3. The washable aqueous ink composition according to claim 1, wherein the at least one alkali metal salt of citrate is trisodium citrate dihydrate.
4. The washable aqueous ink composition according to claim 1, wherein the at least one cyclodextrin or derivative thereof is selected in the group consisting of hydroxypropyl-β-cyclodextrin, α-cyclodextrin, β-cyclodextrin, methyl-β-cyclodextrin, γ-cyclodextrin and mixture thereof.
5. The washable aqueous ink composition according to claim 1, wherein the at least one cyclodextrin or derivative thereof is hydroxy-propyl-β-cyclodextrin.
6. The washable aqueous ink composition according to claim 1, wherein the total amount of the at least one cyclodextrin or derivative thereof is ranging from 1 wt. % to 35 wt. %, based on the total weight of the washable aqueous ink composition.
7. The washable aqueous ink composition according to claim 1, wherein the total amount of the at least one alkali metal salt of citrate is ranging from 0.5 wt. % to 30 wt. %, based on the total weight of the washable aqueous ink composition.
8. The washable aqueous ink composition according to claim 1, wherein the at least one dye comprises an acid dye.
9. The washable aqueous ink composition according to claim 1, wherein the total amount of the at least one dye is ranging from 0.01 to 20 wt. %, based on the total weight of the washable aqueous ink composition.
10. The washable aqueous ink composition according to claim 1, wherein it further contains at least one humectant.
11. The washable aqueous ink composition according to claim 10, wherein the at least one humectant is a water-soluble alcohol having a melting point of less than 20° C. and a boiling point of at least 150° C.
12. The washable aqueous ink composition according to claim 10, wherein the at least one humectant has a solubility in water of at least 10 g/L at 20° C.
13. The washable aqueous ink composition according to claim 10, wherein the at least one humectant is selected in the group consisting of glycerin, ethylene glycol, sorbitol, diethylene glycol, triethylene glycol, propylene glycol, thiodiglycol, and mixtures thereof.
14. The washable aqueous ink composition according to claim 10, wherein the total amount of the at least one humectant is ranging from 1 to 50 wt. %, based on the total weight of the washable aqueous ink composition.
15. The washable aqueous ink composition according to claim 1, wherein it contains an additive.
16. The washable aqueous ink composition according to claim 14, wherein the additive is selected in the group consisting of antimicrobial agents, antifungal agents, dispersing agents, wetting agents, pH regulators, rheology modifiers and mixtures thereof.
17. The washable aqueous ink composition according to claim 14, wherein the total amount of additive is ranging from 0.05 to 15 wt. %, based on the total weight of the washable aqueous ink composition.

18. The washable aqueous ink composition according to claim 1, wherein the total amount of water is ranging from 30 to 98 wt. %, based on the total weight of the washable aqueous ink composition.

19. The washable aqueous ink composition according to claim 1, wherein the total amount of water is ranging from 40 to 95 wt. %, based on the total weight of the washable aqueous ink composition.

20. A writing instrument comprising a washable aqueous ink composition as claimed in claim 1.

* * * * *

UNITED STATES PATENT AND TRADEMARK OFFICE
CERTIFICATE OF CORRECTION

| | | |
|---|---|---|
| PATENT NO. | : 12,460,095 B2 | Page 1 of 1 |
| APPLICATION NO. | : 18/248009 | |
| DATED | : November 4, 2025 | |
| INVENTOR(S) | : Carine Bethouart | |

It is certified that error appears in the above-identified patent and that said Letters Patent is hereby corrected as shown below:

On the Title Page

Item (71), Applicant, after "SOCIÉTÉ BIC," delete "Clichy (FR)" and insert --Clichy Cedex (FR)--.

Item (73), Assignee, after "SOCIÉTÉ BIC," delete "Clichy (FR)" and insert --Clichy Cedex (FR)--.

Signed and Sealed this
Twenty-third Day of December, 2025

John A. Squires
*Director of the United States Patent and Trademark Office*